United States Patent [19]

McGuire

[11] Patent Number: 5,469,739

[45] Date of Patent: * Nov. 28, 1995

[54] ON-LINE FISHING DEPTH INDICATOR WITH ENCAPSULATED COMPONENTS

[75] Inventor: Michael P. McGuire, Ripon, Wis.

[73] Assignee: Bait Data, Inc., Ripon, Wis.

[*] Notice: The portion of the term of this patent subsequent to Oct. 4, 2011, has been disclaimed.

[21] Appl. No.: 274,064

[22] Filed: Jul. 12, 1994

Related U.S. Application Data

[62] Division of Ser. No. 38,412, Mar. 29, 1993, abandoned.

[51] Int. Cl.$^6$ .................................................. G01F 23/14
[52] U.S. Cl. .................................................. 73/301; 43/4
[58] Field of Search ........................ 73/299, 300, 301; 367/118, 130, 131, 141, 908, 910; 43/17, 17.1, 43.1, 4

[56] References Cited

U.S. PATENT DOCUMENTS

| | | | |
|---|---|---|---|
| 333,133 | 11/1885 | Hannay | 73/300 |
| 2,637,998 | 5/1953 | Ramser | 73/301 |
| 3,624,023 | 11/1971 | Hartlage . | |
| 3,785,079 | 1/1974 | Rohn | 43/4 |
| 3,839,856 | 10/1974 | Dargent . | |
| 3,857,283 | 12/1974 | Jennings | 73/300 |
| 3,874,108 | 4/1975 | Connor . | |
| 3,908,636 | 9/1975 | Page . | |
| 4,050,180 | 8/1977 | King | 43/4 |
| 4,600,969 | 7/1986 | Hendrickson . | |
| 4,849,048 | 7/1989 | Ingaki et al. . | |
| 4,894,921 | 1/1990 | Barlow . | |
| 4,920,404 | 4/1990 | Shrimali et al. . | |
| 5,010,212 | 4/1991 | Sumi et al. . | |
| 5,043,716 | 8/1991 | Latz et al. . | |
| 5,187,328 | 2/1993 | Burgess et al. . | |
| 5,351,538 | 10/1994 | McGuire et al. | 73/301 |

FOREIGN PATENT DOCUMENTS 1207303 9/1970 United Kingdom .

Primary Examiner—Thomas B. Will
Assistant Examiner—G. Bradley Bennett
Attorney, Agent, or Firm—Robert C. Curfiss

[57] ABSTRACT

An on-line fishing depth indicator is adapted to be placed either in series or in parallel on a typical fishing line in combination with fishing bait. The indicator is adapted to sense and store the maximum depth of a bait during a trolling operation under controlled conditions. The indicator is activated by a remote activation switch by placing the indicator in the proximity of a non-invasive, remote activation element. The electronics, pressure transducer and visual readout are contained in a shielded, water-tight, encapsulated compartment within the unit.

12 Claims, 3 Drawing Sheets

ON-LINE FISHING DEPTH INDICATOR WITH ENCAPSULATED COMPONENTS

This is a divisional application of application Ser. No. 08/038,412 filed on Mar. 29, 1993, now abandoned.

CROSS-REFERENCE TO RELATED APPLICATION

The subject application is related to U.S. patent application Ser. No. 08/137,394 entitled On-Line Fishing Depth Indicator, by McGuire, Dale and Barker, and assigned to BaitData Inc., filed on Oct. 14, 1993, now U.S. Pat. No. 5,351,538, issued on Oct. 4, 1994.

BACKGROUND OF INVENTION

1. Field of Invention

The subject invention is generally related to a device for determining the water depth of fishing lures and the like and is specifically directed to an on-line indicator for monitoring the depth of fishing bait as it is pulled through the water, the on-line indicator specifically including a sealed on/off switch and an encapsulated electronic unit.

2. Description of the Prior Art

With the development of electronic devices for determining water depth and determining the location of objects in the water, numerous electronic systems have been developed to aid fishing enthusiasts in locating and catching fish. For example, "fish finders" are well known and are used to determine the location of schools of fish in a body of water. The most sophisticated fish finders not only indicate the school but indicate the depth of the school within the specific location. It is common to troll crankbaits, lures and other baits through the water in the vicinity of the school in an effort to attract the fish toward the bait and draw a strike. Typically, this is accomplished by paying out a specific amount of fishing line from a rod and reel located within the boat and then trolling the boat across the surface of the water in the vicinity of the school at a specific speed.

It is common knowledge that different types of bait, dependent on configuration, weight, hydrodynamics and other factors will troll through the water at different, predictable depths. The depth of the bait being pulled through the water is also dependent upon the amount of line payed out from the rod and the speed at which the boat is trolling through the water. It is desirable to know with certainty at what depths specific baits will troll through the water under predefined conditions. For example, if a school of fish is found to be eight feet below the surface of the trolling boat, it is advantageous to know what bait can be secured to the line to troll the water in the vicinity of eight feet, greatly increasing the chances for drawing fish toward the bait. In a typical example, if 200 feet of line is payed out from the boat and the boat is trolling through the water at three miles per hour, specific baits will troll through the water at a predetermined and predictable depth. If the length of line or the speed is changed, the bait will react in a different manner. In the past, the depth of the bait has been determined through trial and error and, at best, the results have been less than accurate. However, detailed logbooks have been created cataloguing various baits under controlled conditions. Tournament participants, in particular, have relied on these logbooks in an effort to use bait consistent with the conditions in an effort to obtain predictable results. Such efforts have met with spotty success.

The aforementioned application, U.S. Ser. No. 08/137,894, now U.S. Pat. No. 5,351,538 is specifically directed to an on-line fishing depth indicator for determining the performance of a bait pulled through the water under specific, predetermined conditions. The fishing depth indicator of that invention has a hydrodynamic design permitting it to be pulled through the water with the bait without interfering with the performance of the bait, giving an accurate reading of the performance of the bait as it is trolled through the water. The preferred embodiment of that invention permits the indicator to be pulled through the water either in series with or in parallel with the subject bait without impairing the depth performance of the bait. The depth indicator may be secured in advance of the bait or in a trailing position behind the bait while still giving an accurate readout. As there shown, a visual readout is provided for indicating the maximum depth the bait has reached during the trolling operation. Preferably, the indicator includes a transparent window through which an LCD readout may be read for visually ascertaining the performance of the bait. In the preferred form, the depth may be read in either the English or the metric system.

Other examples of depth indicators for use in sport fishing, tournament fishing and the like are shown, for example, in U.S. Pat. No. 2,821,805 issued to W. Kunze on Feb. 4, 1958, and U.S. Pat. No. 3,038,143 issued to W. Dow on Jun. 5, 1962. The Kunze patent discloses a fish finding apparatus having a depth gauge attached to a net and adapted for pulling the net through the water at a specific depth in order to increase the chances that the net will be pulled through a school of fish. The Dow patent discloses a telemetering depth meter and a hydrophone adapted for pulling a net through the water at a specific depth. Both the Kunze and Dow patents are particularly suited for commercial fishing. Neither of these devices is readily capable for sport fishing and is not adaptable for determining the operating depth of specific baits.

Examples of depth sensitive transducers are shown in U.S. Pat. No. 3,308,425 issued to McLoad on Mar. 7, 1967, U.S. Pat. No. 4,225,952 issued to Lewis on Sep. 30, 1980, U.S. Pat. No. 4,926,397 issued to Robertson on May 15, 1990 and U.S. Pat. No. 4,943,951 issued to Leayell, et al on Jul. 24, 1990. Each of these patents discloses various circuitry and devices for measuring water depth through the utilization of a pressure transducer or the like. Examples of depth indicators for use by boaters and divers are disclosed in U.S. Pat. No. 2,674,881 issued to Rich on a Apr. 13, 1954 and U.S. Pat. No. 3,856,283 issued to Jennings, et al on Dec. 31, 1974.

SUMMARY OF THE INVENTION

The subject invention is specifically directed to an on-line fishing depth indicator of the type shown and disclosed in the earlier U.S. patent application Ser. No. 08/137,394, filed on Mar. 4, 1992, and assigned to BaitData Inc., now U.S. Pat. No. 5,351,538, incorporated by reference herein. As there described including an electronic means which is housed within the cavity of the body and is in direct communication with the pressure sensor for producing a usable output signal, wherein the visual readout device is also housed in the cavity and adapted for receiving the electronic signal and producing a visual readout indicating the depth corresponding to the pressure sensed by the sensor. In the subject invention, the visual readout device and electronic means are enveloped in an insulating material for maintaining the electronic means and readout device in the cavity in a water-tight compartment. In the preferred embodiment the insulating material is transparent, permitting the visual readout device to be read through the material.

In addition, it is an important feature of the improvement of the subject invention that the ON/OFF and mode switch for activating the electronic means and the visual readout device is sealed within the cavity and is remotely activated in a non-contact, non-invasive manner with a remote activator which is independent of and separate from the body of the fishing depth indicator. The activator is functional for selectively switching the switch between ON and OFF positions and through the various modes by placing the fishing depth indicator in the activator proximity.

It has also been found to be beneficial to envelop the electronic means in an opaque shield, protecting the circuitry from sunlight and other reflective, damaging rays. In the preferred embodiment the electronic circuit means is enveloped in a silicone shield and the invention is specifically directed to the method of manufacturing assembling the fishing depth indicator, including the placement of the remotely activated ON/OFF switch, the application of the shield and the encapsulation of the circuitry, readout device and switch in a water-tight, potted compartment.

It is another important aspect of the subject invention to provide for a carrying pouch for the fishing depth indicator wherein the remote activator is positioned directly in the pouch and is permanently housed therein, for activating the indicator through the body by placing the indicator in a predescribed proximity and orientation with the pouch.

It is, therefore, an object and feature of the subject invention to provide a fishing depth indicator having sealed electronic and readout system with a remotely activated mode switch permitting non-invasive activation and setting of the indicator through the body of the indicator.

It is another object and feature of the subject invention to provide an on-line fishing depth indicator having a sealed electronic means and readout device.

It is an additional object and feature of the subject invention to provide an on-line fishing depth indicator having a remote activator which activates and selects the mode of the indicator by placing the indicator in proximity to the remote activator.

It is yet another object and feature of the subject invention to provide a fishing depth indicator wherein the electronic circuit means is shielded with an opaque substance to guard against invasion by intense light and heat rays.

It is an additional object and feature of the subject invention to provide the method of assembling an on-line fishing depth indicator having a sealed, contained electronic and readout system with a remotely activated ON/OFF and mode sequencing switch.

Other objects and features of the subject invention will be readily apparent from the accompanying drawings and detailed description of the preferred embodiment.

BRIEF DESCRIPTION OF THE DRAWINGS

FIG. 7 is a perspective view of the assembled pressure tube and electronic means and visual readout device, ready for insertion into the cavity in the body of the indicator.

FIG. 8 shows the assembled electronic means, visual readout device, pressure tube and body, ready for application of the potting compound.

DETAILED DESCRIPTION OF THE PREFERRED EMBODIMENT

Figure 1:
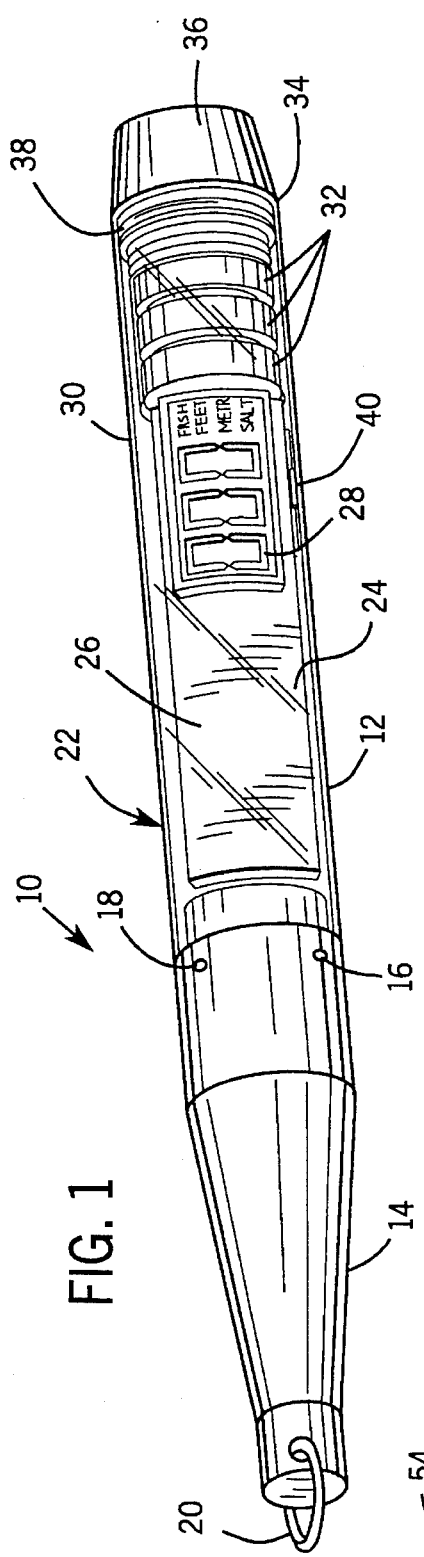
FIG. 1 is a perspective view of an assembled fishing depth indicator in accordance with the subject invention.

The fishing depth indicator 10 of the subject invention is shown in FIG. 1, and corresponds generally to the fishing depth indicator shown and described in the aforementioned patent application U.S. Ser. No. 08/137,394, filed on Oct. 14, 1993 and now issued as U.S. Pat. No. 5,351,538, on Oct. 4, 1994, and incorporated by reference. In the embodiment of the subject invention, the fishing depth indicator includes a main body portion 12, a nose piece 14 which defines a pressure tube having radial ports 16 and 18. The ports 16 and 18 are in communication with a pressure sensor for reading the pressure of the water in which the indicator is immersed to determine the depth, as more clearly described in the aforementioned earlier application.

The nose piece includes a ring 20 by which the fishing depth indicator may be attached to a swivel or directly to a fishing line for trolling the indicator behind the fishing line, along with a crank bait as described in the prior application. The body 12 is hollow, defining a cavity 22 for housing the electronic circuit and control means 24, which are typically mounted on a printed circuit board 26 in the well-know manner and a visual readout device such as the alphanumeric LCD display 28, which also may be mounted directly on the board 26. At one end of the cavity is a compartment 30 adapted for housing and containing a power supply such as the batteries 32 which are then in communication with the electronic operating and control means, in the manner well known to those who are skilled in the art.

In the preferred embodiment, the outer end 34 of the body 22 is open and includes an end cap or tail piece 36 for closing the battery compartment. It is desirable to provide a resilient seal such as O-ring 38 between the end cap 36 and the body 22 to provide a water-tight seal for the battery compartment.

Figure 2:
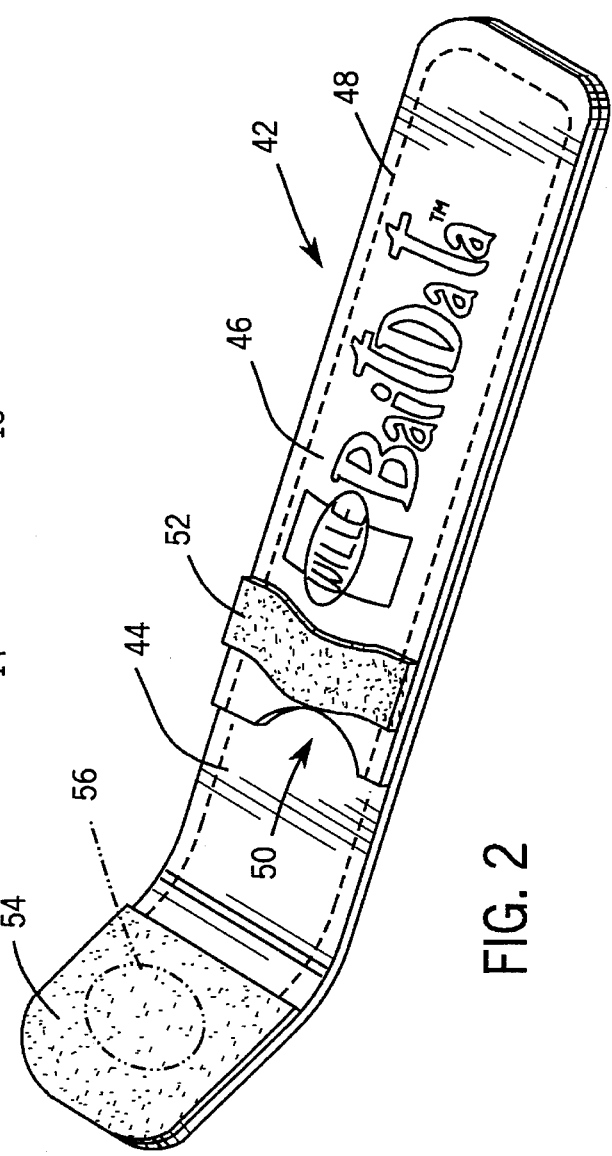
FIG. 2 is a perspective view of a pouch for carrying and storing the fishing depth indicator and the remote activator for activating and selecting the mode of the indicator, in accordance with the subject invention.

In the preferred embodiment of the invention, an ON/OFF switch 40 is attached to the board 26 and is in electrical communication with the electronic means and the visual readout. Typically, the ON/OFF sensor 40 is a magnetic relay which is activated and sequentially switched through its various modes by bringing the relay into proximity with a remote sensor such as a permanent magnet or the like. In the preferred embodiment, of the sensor 40 is a reed sensor, part number MDSR-4, available from Hamlin Manufacturing. The carrying case or pouch 42 for housing the indicator 10 when not in use is shown in FIG. 2. As there shown, the pouch generally comprises a base 44 and a top 46 side stitched 48 to form an envelope or pouch having an opening at 50 for receiving the indicator 10. In the preferred embodiment of the invention, a Velcro or other hook and loop type fastener pad or strip may be attached at 52 with a complementary pad 54 positioned on the outer end of the base 44 for defining a flap closure for the pouch. Between the Velcro pad 54 and the base 50 is a sealed compartment ideally suited for housing a disc type magnet, shown in phantom at 56. The disk type permanent magnet or other sensor disk is adapted for activating and sequencing the ON/OFF sensor 40 in the body of the indicator 10.

Figure 3:
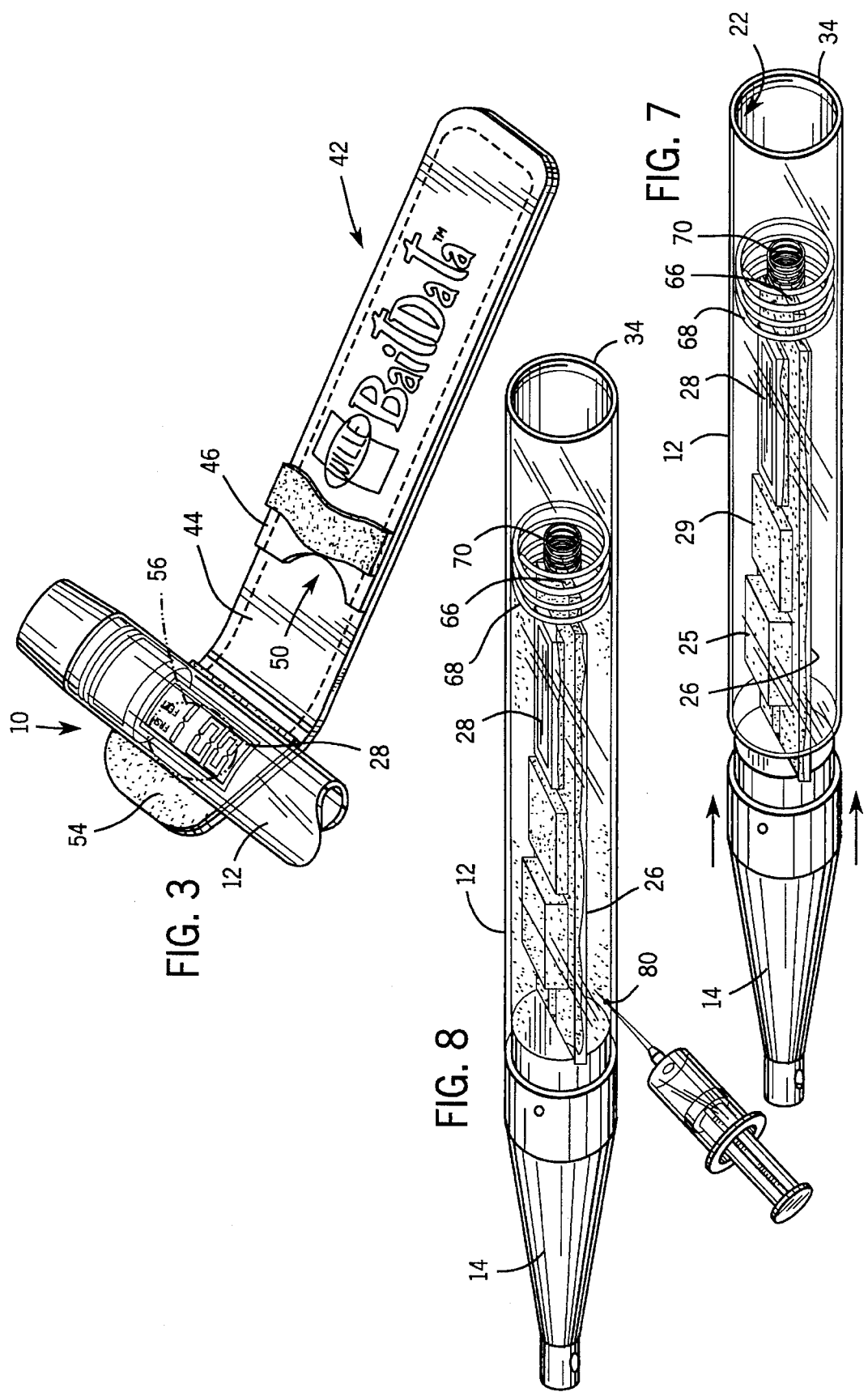
FIG. 3 is an illustration looking in the same direction as FIG. 2, demonstrating the setting of the mode of the indicator by using the remote activator.

As shown in FIG. 3, the fishing depth indicator of the subject invention is activated by placing the visual readout 28 in a visible, readable position with the body 12 of the indicator 10 against the pad 54 of the pouch and in the proximity of the sensor 56. The magnetic field created by the sensor 56 is operable to activate the switch and on sequential passes will switch the circuitry provided on the board 26 through the various modes of operation, in a manner similar to the sequencing shown and described in the aforementioned application, U.S. Ser. No. 08/137,394.

In the preferred embodiment, the MOVE switch operates through the following sequences: ON, fresh water/English mode, fresh water/metric mode, salt water/English mode, salt water/metric mode, and timed OFF. In the preferred embodiment, once the device has been activated, it remains ON and in the selected MODE until it has been idle for a specified period of time, and then it automatically shuts down. This assures preservation of battery power. As described in the aforementioned application, the electronic control circuitry mounted on board 26 is adapted to translate the pressure readings sensed by the pressure sensor system into depth readings. The circuit is programmed to give raw readings which may be translated into the differentiating pressures created by the difference in density of salt water and fresh water applications. The programmable features of the systems are also designed to turn OFF the visual display as soon as pressure is sensed in the radial ports 16 and 18, to preserve battery power. Specifically, the visual display is set to automatically turn OFF as soon as the indicator is in a foot of water or greater depth and will automatically reactivate as soon as the pressure level in the ports indicates that the indicator is in less than one foot of depth. Thus, whenever the digital display is visible to the human eye, it is automatically activated when in the ON mode and automatically deactivated when in the ON mode but unreadable because it is submerged in water.

Figure 4:
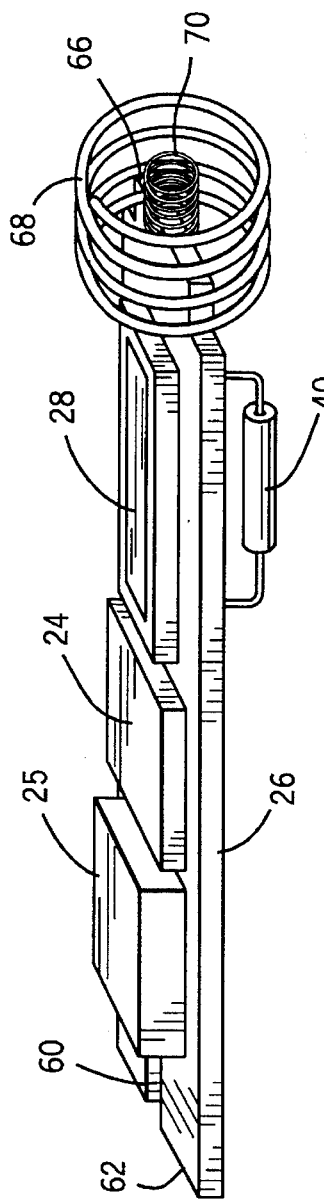
FIG. 4 is a perspective view of the electronic means and visual readout device of the subject invention.

It is an important aspect of the invention that the electronic control means and visual display device be housed in a water-tight compartment. Therefore, a unique method of manufacture and assembly has been developed, as shown in FIGS. 4-8. Specifically, as shown in FIG. 4, the electronic control and operating means are discrete circuit components such as those diagrammatically illustrated at 24 and mounted on the circuit board 26. The pressure transducer circuitry 25 may also be mounted directly on the board 26 as well as the visual display 28. The sensor element 40 is also mounted on the board, as shown in FIG. 4.

Figure 6:
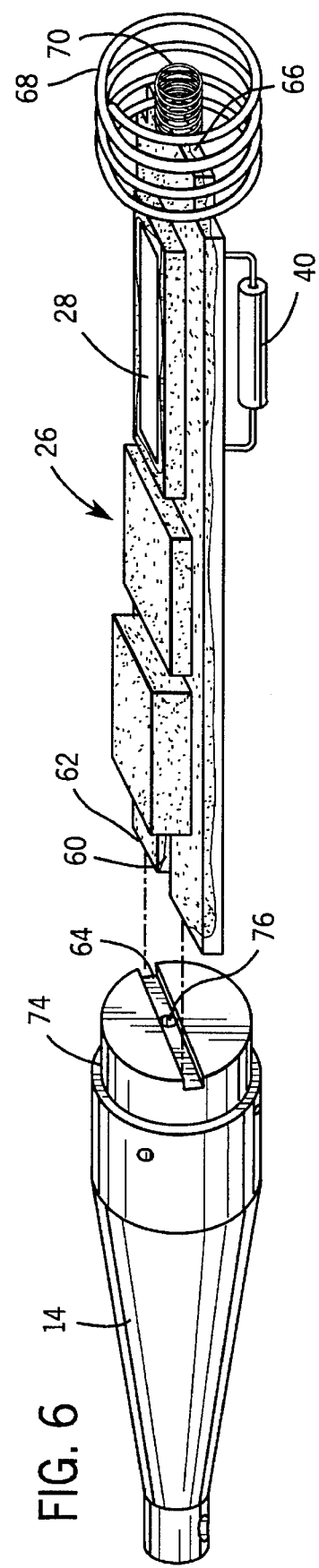
FIG. 6 is a perspective view of the electronic means and visual readout device and the pressure tube of the indicator, ready for assembly.

In the preferred embodiment, a slot 60 is provided at the end of the board 62 which is to be received in a slot 64 provided in the nose piece or pressure tube 14, as shown in FIG. 6, and as will be described. The opposite end 66 of the board is formed into a tab to define a seat for the outer compression spring 68 and the inner conductor compression spring 70, adapted for use in connection with the battery compartment 30 as also will be described.

Figure 5:
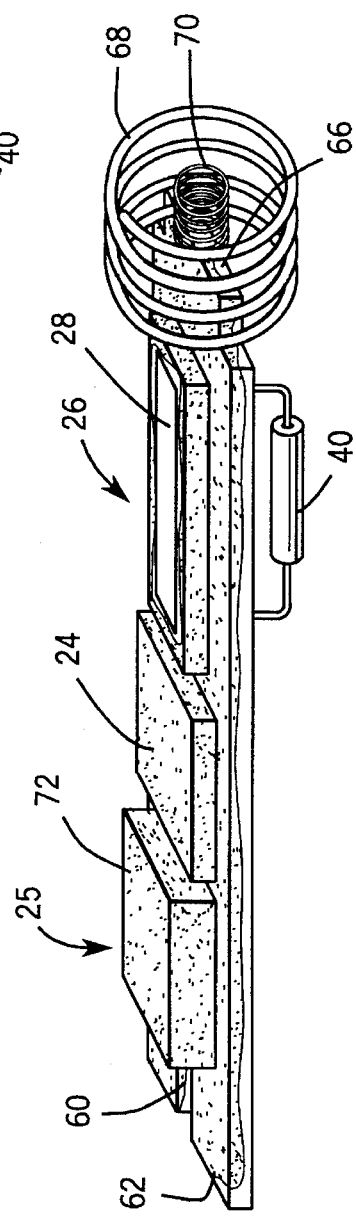
FIG. 5 is a view looking in the same direction as FIG. 4, illustrating the condition of the electronic means and visual readout device after the opaque shield has been applied.

As shown in FIG. 5, once the board 26 and various components have been assembled, the board is enveloped in a moisture protectant silicone solution to form a shield 72 covering and protecting the various circuit components and the board from sunlight. The window of the visual display 28 is left exposed, as shown. In the preferred embodiment, the silicone shield contains a zinc oxide pigment to provide an opaque covering.

After curing the shield solution to form a hardened protective shield over the circuit components, the board assembly is ready to be mounted on the nose piece 14 of the indicator, as shown in FIG. 6. In the preferred embodiment, a radial slot 64 is provided in the end 74 of the nose piece and is adapted to receive and engage in a friction or snug fit the end 62 of the board 26. The wires or other conductors connecting a pressure transducer with the circuit board pass through the axial opening 76 in the nose piece and the slot 60 provided in the circuit board.

Once the circuit board 26 has mounted in the slot 64 of the nose piece 14, the end 74 of the nose piece is inserted into the cavity of the clear body 12, as shown in FIG. 7. A water-tight sealing adhesive is placed between the end 74 of the nose piece and the inner peripheral wall of the cavity 22.

At this point, a clear urethane potting compound is injected by syringe through a small hole 80 provided in the wall of the body 10 and in communication with the cavity 22. The potting compound encapsulates the entire electronic component assembly of the unit up to the tab portion 66 of the board, encapsulating all of the components in a transparent water-tight compartment.

The tab area 66 of the circuit board, along with springs 68 and 70 are in the hollow compartment 30 behind by the end of the potting compound and in advance of the open end 34 of the body. The hollow compartment defines a battery compartment 30 for housing the batteries 32 as shown in FIG. 1. Typically, the end 34 of the body is internally threaded for receiving the threaded end cap 36 which is then placed on the end 34 and tightened therein to force the batteries 32 against the compression springs 68 and 66. The outer compression spring 68 provides a tight fit for providing good physical contact between the various batteries 32. The inner spring 66 provides electrical contact between the batteries and the circuit board. A ground strap, not shown, is connected to the opposite side of the battery in the vicinity of the end cap 36 in the manner well known to those who are skilled in the art.

By following the assembly method of the subject invention, the assembled unit shown in FIG. 1 is a sealed, integral unit with the electronic components in a water-tight, encapsulated compartment. It has been found that an assembly in accordance with the subject invention is ideally suited for both fresh water and salt water applications and is impervious to environmental conditions which might cause damage to the fragile electronic components.

While specific features and embodiments of the invention have been described in detail herein, it will be readily understood that the invention includes all enhancements and modifications within the scope and spirit of the following claims.

What is claimed is:

1. An on line, trollable fishing depth indicator for monitoring the water depth of a trollable fishing bait when both the depth indicator and the bait are secured to and trolled by a fishing line, the fishing depth indicator of the type including an elongate body having an outer peripheral wall, opposite closed ends and a hollow interior cavity, through ports in the body and in communication with the cavity, means for securing the body to a fishing line in combination with a fishing bait for trolling the body through the water with the fishing bait, and a pressure sensor in the cavity and in communication with the ports for reading the water pressure in the ports and producing in response thereto a usable output signal indicating the water depth of the transducer, the trollable fishing depth indicator further comprising:

a. electronic means housed in the cavity and in communication with the pressure sensor and adapted for producing an electronic signal in response to the usable output signal;

b. a visual readout device housed in the cavity and adapted for receiving the electronic signal and producing therefrom a visual readout indicating the depth corresponding to the pressure sensed by the sensor; and c. an insulating material enveloping the electronic means and the visual readout device and sealing same in the cavity.

2. The fishing depth indicator of claim 1, wherein the insulating material is transparent.

3. The fishing depth indicator of claim 2, further including an opaque coating applied to and enveloping the electronic means, and leaving the visual readout device exposed.

4. The fishing depth indicator of claim 1, further comprising:

a. a remote activated on/off switch associated with the electronic means and the visual readout device selectively activating and deactivating same, the on/off switch housed within the cavity; and b. a remote activator independent and separate from the body and adapted for selectively switching the switch between on and off.

5. The fishing depth indicator of claim 4, wherein the electronic means is operative to generate an output signal corresponding to any one of a plurality of operating modes of use of the fishing depth indicator.

6. The fishing depth indicator of claim 5, wherein the remote activated is switch is sensitive to a magnetic field and responsive to changes in the magnetic field to switch between the off and on conditions, and wherein the remote activator is a permanent magnet.

7. The fishing depth indicator of claim 5, wherein the output signal is selectively modified to correspond to a fresh water/English operating mode, a fresh water/metric operating mode, a salt water/English operating mode, and a salt water/metric operating mode.

8. The fishing depth indicator of claim 5, wherein the switch is a sequential switch operable for selectively sequencing the electronic means and the visual readout through the operating modes.

9. The fishing depth indicator of claim 4, further comprising:

a. a pouch adapted for removably carrying the body when not in use; and b. a receptacle in the pouch for housing the remote activator.

10. The fishing depth indicator of claim 9, wherein the remote activator is permanently housed in the pouch.

11. The fishing depth indicator of claim 10, wherein the remote activated switch is sensitive to a magnetic field and responsive to changes in the magnetic field to switch between the off and on conditions, and wherein the remote activator is a permanent magnet.

12. The fishing depth indicator of claim 1, further comprising:

a. a removable end cap on one closed end of the body for gaining access to the cavity;

b. an open chamber between the insulating means and said one closed end;

c. a power cell in the chamber and between in communication with the electronic means and the visual readout device for powering same; and d. a seal between the end cap and said one end of the body.

\* \* \* \* \*